US006428877B1

(12) United States Patent
Suss et al.

(10) Patent No.: US 6,428,877 B1
(45) Date of Patent: Aug. 6, 2002

(54) SCANNING IMAGE AND THERMOTRANSFER FOIL FOR PRODUCTION THEREOF

(75) Inventors: Joachim Suss, Fürth; Ludwig Brehm, Adelsdorf, both of (DE)

(73) Assignee: Leonhard Kurz GmbH & Co., Furth (DE)

( * ) Notice: Subject to any disclaimer, the term of this patent is extended or adjusted under 35 U.S.C. 154(b) by 0 days.

(21) Appl. No.: 08/793,826

(22) PCT Filed: Aug. 30, 1995

(86) PCT No.: PCT/DE95/01179

§ 371 (c)(1), (2), (4) Date: Feb. 21, 1997

(87) PCT Pub. No.: WO96/07543

PCT Pub. Date: Mar. 14, 1996

(30) Foreign Application Priority Data

Sep. 3, 1994 (DE) ........................................ 44 31 532

(51) Int. Cl.[7] ............................ B32B 27/14; B32B 3/00

(52) U.S. Cl. .................... 428/195; 428/204; 428/488.1; 428/913; 428/914

(58) Field of Search ................................ 428/195, 192, 428/411.1, 204, 488.1, 913, 914

(56) References Cited

U.S. PATENT DOCUMENTS

| | | | | | |
|---|---|---|---|---|---|
| 4,503,095 | A | * | 3/1985 | Seto et al. | 427/265 |
| 4,615,932 | A | * | 10/1986 | Onishi et al. | 428/207 |
| 4,670,307 | A | * | 6/1987 | Onishi et al. | 427/261 |
| 4,871,609 | A | * | 10/1989 | Suzuki et al. | 428/195 |
| 5,538,577 | A | * | 7/1996 | Negoro | 156/235 |
| 5,843,563 | A | * | 12/1998 | Tuyuguchi et al. | 428/212 |

* cited by examiner

*Primary Examiner*—Bruce H. Hess
*Assistant Examiner*—B. Shewareged
(74) *Attorney, Agent, or Firm*—Hoffmann & Baron, LLP

(57) ABSTRACT

Proposed is a scanning image which is produced by a thermotransfer process and which has at least two kinds of scanning elements, wherein at least two kinds of scanning elements are of respectively different dimensions. In addition at least two kinds of scanning elements may respectively involve different, optically effective structures. A thermotransfer foil for the production of such a scanning image is also described.

20 Claims, 1 Drawing Sheet

SCANNING IMAGE AND THERMOTRANSFER FOIL FOR PRODUCTION THEREOF

BACKGROUND OF THE INVENTION

The invention concerns a scanning image which comprises at least two kinds of scanning elements having different properties and which is produced in a thermotransfer process. It further concerns a thermotransfer foil for the production of a scanning image of that kind, in which the transfer layer which can be transferred from a carrier film onto the substrate, to produce the different scanning elements, has a number, corresponding to the number of different scanning elements, of regions which are respectively associated with a kind of scanning element and which are of correspondingly different natures.

The known thermotransfer printing processes, for producing half-tone images, usually operate with a scanning procedure, wherein scanning elements or points of normally equal size are transferred from the thermotransfer foil onto the substrate, in a scanning element density which differs according to the desired brightness of the scanning image. If multi-colour scanning images are to be produced, this procedure involves using thermotransfer foils whose transfer layer is respectively subdivided into a plurality of regions, wherein associated with each colour is a specific region of the, transfer layer. In the printing operation the thermotransfer foil is then moved over the substrate, in a manner corresponding to the desired colour, and coloured scanning elements are produced by means of the printing tool, wherein generally the differently coloured regions of the transfer layer of the thermotransfer foil correspond in terms of their dimensions, to the substrate to be printed upon.

In that way it is possible to produce scanning or raster images of good quality, when using a correspondingly close scanning raster and small scanning elements. Nonetheless, in the known procedure, either the possible design configurations are limited, or operation must be conducted with very small scanning elements or points and very small scanning element spacings, so that the apparatus expenditure becomes very high. The production of partly matt and partly shiny or reflecting scanning images has not been considered hitherto.

SUMMARY OF THE INVENTION

The object of the present invention therefore is to develop further possible design configurations for scanning images, without having to involve a particularly high level of apparatus expenditure.

To attain that object, in accordance with the invention it is proposed that a scanning image of the kind set forth in the opening part of this specification is such that at least two kinds of scanning elements are of respectively different dimensions. When the scanning image is of such a configuration, to produce half-tones it is no longer necessary for the spacing of the scanning elements or the density thereof to be altered. If there is the possibility of providing scanning elements of different dimensions, which is a possibility which has hitherto never yet been used, then regions of the scanning image can be produced with a lower level of colour density by virtue of using scanning elements of smaller diameter while, when a full or deep colour or a good covering effect is to be achieved, scanning elements of larger diameter are used. That variation in the scanning element size is advantageous in particular when the scanning elements are of a specific structure and for example are reflecting as in such a situation the variation in the scanning element size provides for a particularly uniform effect in regard to the respective structure involved.

Further possible configurations for the scanning image are afforded if at least two kinds of scanning elements or points are each of a different, optically effective structure. For example a scanning image can be composed of elements or points with a matt surface and elements or points with a shiny surface, whereby that permits not only the usual half-tone or colour resolution of a scanning image, but it also affords the possibility of constructing the scanning image by different shine effects etc. That gives quite specific scanning images which differ from the previously known scanning images and which are particularly difficult to imitate and which cannot be reproduced for example by means of a colour copier, which means that such scanning images are particularly suitable for example as security elements for value-bearing documents such as for example banknotes, credit cards, identity cards or passes or the like which in fact are increasingly the subject of attempts at forgery, in particular using modern colour copiers.

It is particularly advantageous if the optically effective structure of at least one kind of scanning elements is a diffraction structure which produces diffraction or interference, preferably a grating structure. The most widely varying optical effect can be generated by means of diffraction or interference structures of that kind, the respective structure to be used depending on whether the scanning image is observed in a reflecting light mode or in a transmission light mode.

By means of different structures, and this is known per se, it is for example also possible to form a scanning image in the form of an optically variable image, more specifically in such a way that the scanning image changes in dependence on the lighting or viewing angle or the wavelength of the light used for lighting purposes, in which case only the colour position varies in the simplest form. In such a situation, using two kinds of scanning elements of different diffraction structures, by means of which for example alphanumeric characters are produced, can provide that the colour of the characters on the one hand and the background on the other hand alter in dependence on the viewing angle or the light used for illumination purposes.

In order to enhance diffraction or interference effects of that kind, it is desirable for at least one kind of scanning elements to be provided with a reflecting layer whereby those elements are of a corresponding level of brightness. By using a reflecting layer in relation to only one kind of scanning elements, it can further be provided that those scanning elements appear substantially brighter relative to the other scanning elements forming the scanning image, whereby it is possible to achieve graphic effects which were hitherto unknown in relation to scanning images. It will be appreciated however that it is also possible for all scanning elements forming the scanning image to be of a reflecting character, but for them each to be provided with a respectively different structure, for example for given kinds of the scanning elements to be formed with a grating structure while other scanning elements have a flat reflecting layer.

Finally it will be appreciated that it is also possible for at least two kinds of scanning elements to be of respectively different colours, whereby the possible configurations are additionally increased.

A thermotransfer foil of the kind set forth in the opening part of this specification for the production of a scanning image according to the invention is distinguished in that the transfer layer in the different regions has scanning elements of different dimensions in order for example always to be able to work with the same scanning element density, while however nonetheless having the possibility of producing locations of the substrate image on the substrate, which locations involve denser or less dense printing.

A thermotransfer foil can also desirably be such that the different regions of the transfer layer each involve a respective optically differently effective structure. To produce the scanning image the respective scanning elements are then transferred onto the substrate from the different regions of the transfer layer with the structure that has different optical effects, for which purpose the thermotransfer foil must be moved relative to the substrate in the manner known from thermo-colour printers, in order to bring the respective region of the transfer layer which has the desired surface structure into a position over the corresponding location of the substrate.

Particular effects can be achieved if the transfer layer has a reflecting layer at least in one region, wherein the reflecting layer is desirably formed by a metallisation because then the scanning image can be composed of reflecting and non-reflecting regions or, if all regions of the transfer layer are of a reflecting nature, it is possible to produce images of particular brightness.

That is of significance in particular if the optically effective structure of the transfer layer is a diffraction structure for producing diffraction or interference, in particular a grating structure.

In order to produce scanning images of suitable durability, it may be desirable if, in at least one region, adjoining the carrier film, the transfer layer has a transparent protective lacquer layer, because that can then increase the abrasion resistance of the scanning image which is produced on the substrate.

When there is a transparent protective lacquer layer, that layer can advantageously have colours which are different in at least two regions of the transfer layer, thereby affording the possibility of producing multi-colour scanning images.

The optically effective structure of the transfer layer is advantageously produced by it being impressed or stamped into a lacquer layer of the transfer layer. Corresponding stamping processes are known from the production of hot stamping foils with diffraction structures etc. In that case the structures are impressed or stamped by means of a die into a thermoplastic lacquer or a lacquer which has not completely hardened. That process can in principle be applied in the same manner to thermotransfer foils or the transfer layers thereof, in which case it can be at most necessary to adapt the structure depth to the area of use, because the thickness of the transfer layer of thermotransfer foils is limited, in order to guarantee satisfactory transfer of the transfer layer onto the substrate, using the known apparatuses.

Finally it may be advantageous if the protective lacquer layer covers the optically effective structure when the transfer layer is applied to a substrate because that then makes it difficult if not even impossible to take a casting therefrom and thus produce a forgery. At the same time that increases the durability of the scanning image because the surface structure is protected from direct mechanical attacks.

In regard to the basic structure of the transfer layer of the thermotransfer foil, attention can be directed to per se known foils as well as hot stamping foils, in which respect the point to be emphasised as the only difference in the thermotransfer foil according to the invention in comparison with known thermotransfer foils is that, in the case of the thermotransfer foil according to the invention, structuring of the surface of the transfer layer which is to be transferred onto the substrate must be effected at least in one region, and for that reason a suitably deformable layer must be provided. Further details relating to the composition of the layers and the thicknesses thereof are set out hereinafter.

BRIEF DESCRIPTION OF THE DRAWINGS

Further features, details and advantages of the invention are apparent from the following description of an embodiment of a scanning image and a thermotransfer foil suitable for producing the scanning image, with reference to the drawing in which.

DESCRIPTION OF THE PREFERRED EMBODIMENTS

Figure 1:
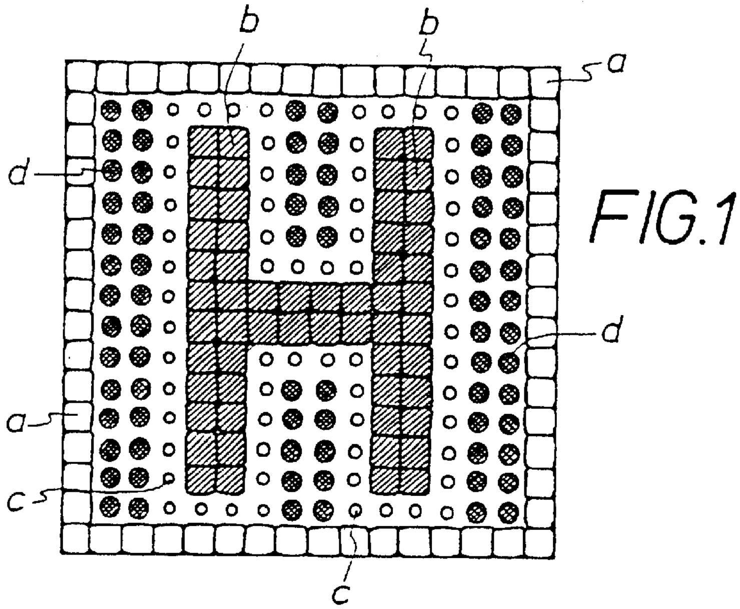
FIG. 1 is a diagrammatic example of a scanning image which is composed of four different types of scanning elements or points.

The scanning image shown in FIG. 1 comprises four different types of scanning elements or points. Accordingly the thermotransfer foil shown in FIGS. 2 and 3 respectively has in succession four different regions A, B, C and D, by means of which the scanning elements or points of types a, b, c and d are produced.

Figure 3:
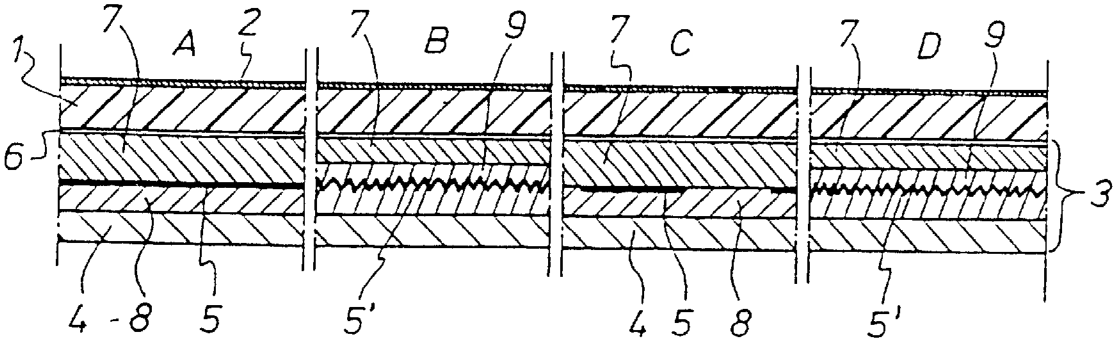

The scanning elements of type a are comparatively large scanning elements which are close together corresponding to the dimensions of the tool used for the transfer operation, the scanning elements having a surface which in the present example is smooth and which is of a reflecting nature by virtue of a metal covering. The scanning elements of type b are also comparatively large in area and have a surface which is overall provided with a reflecting layer. However, as is indicated in FIG. 3, portion B, the scanning elements of type b are markedly structured, wherein the scanning elements of type b are preferably provided with a grating structure or generally with a diffraction structure which produces a diffraction or interference effect.

While the dimensions of the scanning elements of type a and b depend only on the dimensions of the tool used for corresponding transfer of the transfer layer onto a substrate, for example dots (the illustrated embodiment uses a dot which is so large that coverage of the substrate over its full area is possible by arranging scanning elements of types a and b in closely adjoining relationship), the scanning elements of types c and d are independent of the diameter of the tool serving for transfer of the transfer layer.

The scanning elements of types c and d differ on the one hand in respect of their diameter. The scanning elements of type d are of a substantially larger diameter than the scanning elements of type c. In addition there is a difference between the scanning elements of types c and d in that the scanning elements of type c have a smooth metallised surface while the scanning elements of type d have a surface which for example is structured to correspond to the scanning elements of type b.

In the illustrated embodiments all types of scanning elements a, b, c and d are respectively provided with a reflecting layer so that the scanning image as shown in FIG.

1 appears to be overall of a metallically reflecting nature so that it can be particularly desirably used as a security element for a value-bearing document or the like.

Figure 2:
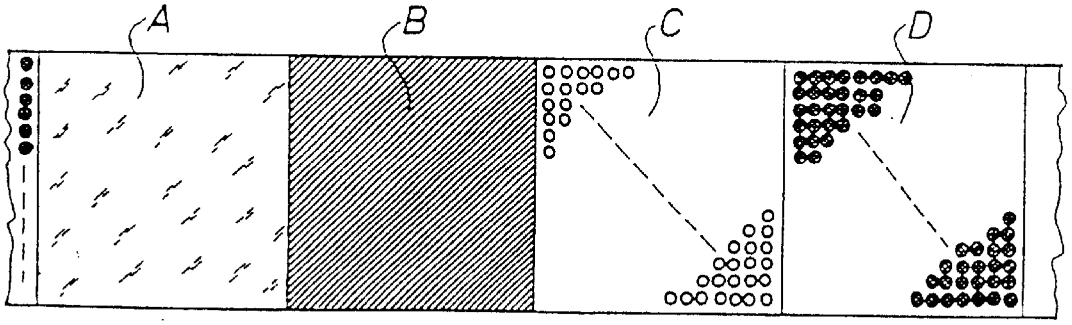
FIG. 2 is a diagrammatic view of a portion of a thermotransfer foil for producing the scanning image of FIG. 1 with four different regions, and FIG. 3 diagrammatically shows a view in longitudinal section through the foil of FIG. 2, but showing in each case only short portions of the individual regions.

Further details of the scanning elements of types a, b, c and d will be apparent with reference to the more detailed description of the thermotransfer foil in connection with FIGS. 2 and 3.

As FIG. 3 in particular shows a thermotransfer foil for the production of a scanning image according to the invention usually includes a carrier film 1 which carries a per se known sliding or anti-friction layer 2 on its side which is upward in FIG. 3 and which in use is towards the thermal transfer strip or block. Provided on the side of the carrier film 1, which is opposite the anti-friction layer 2, is a transfer layer which is generally denoted by reference numeral 3 and which comprises a plurality of layer portions and which in the thermotransfer process is detached from the carrier film 1 and fixed on the substrate which is not shown in the drawing, for example a sheet of paper or the like.

Starting from the carrier film 1, the transfer layer 3 includes at any event a lacquer layer and a usually heat-sealable adhesive layer 4 which serves to fix the lacquer layer on the substrate.

In the illustrated embodiment the structure of the transfer layer 3 is somewhat more complicated. In that case it is assumed that the scanning elements each include a respective reflecting layer 5 and 5' formed by a metallisation.

In order to guarantee easy detachment of the transfer layer 3 from the carrier film 1, the carrier film 1 is provided with a separation or detachment layer 6, usually a layer of wax, prior to the application of the remaining layer portions of the transfer layer 3. The wax layer 6 is then generally adjoined by a layer 7 of a transparent protective lacquer. In addition, a bonding agent or primer layer 8 is normally provided between the adhesive layer 4 and the metallisation 5 or 5' respectively.

The transfer layer 3 of the thermotransfer foil shown in FIGS. 2 and 3 is identical in the various regions A, B, C and D insofar as there is always provided a detachment layer 6, a transparent protective lacquer layer 7, a metallisation 5 or 5', the bonding layer 8 and the adhesive layer 4.

However certain modifications are required for providing the different types of scanning elements a, b, c and d.

In the region A which serves to provide the smooth large-area scanning elements a, a smooth metallisation 5 covering the entire surface area is provided directly on the protective lacquer layer 7. To produce the scanning elements of type a, corresponding regions are separated out of the transfer layer 3 (in accordance with the size of the dots used for the transfer operation) and transferred from the carrier film 1 onto the substrate.

The regions B of the thermotransfer foil which serve to produce the scanning elements of type b are also provided over the entire surface area with a metallisation 5'. The difference relative to the regions A however is that the metallisation 5' is not smooth but is in the form of a grating structure or other diffraction structure (see FIG. 3). In order to permit that, in the regions B between the transparent protective lacquer layer 7 and the metallisation 5 the transfer layer 3 has a further lacquer layer 9 which can be suitably structured. For that purpose the lacquer layer 9 can be formed for example by a thermoplastic lacquer or also by a lacquer which is still deformable in a certain time so that in a replication process the corresponding structure for the metallisation 5' can be impressed or stamped into the lacquer layer 9. The scanning elements of the type b are produced, in accordance with the elements of the type a, by a procedure whereby a portion corresponding to the size of the dot is separated out of the transfer layer 3 and transferred onto the substrate by means of the dot.

Therefore the size of the scanning elements produced, in the case of the scanning element of types a and b, only depends on the resolution of the thermoprinter serving to produce the scanning dots, or other tool.

In comparison the configuration of the regions C and D of the thermotransfer foil is such that the size of the scanning elements of type c and type d produced is independent of the size of the corresponding transfer tool. More specifically, in the regions C and D the size of the scanning dots which appears is predetermined by the area of the metallisation 5 and 5' respectively present. That means that the metallisation 5, 5' is respectively present only in a region-wise manner in the regions C and D which basically correspond to the regions A and B respectively. The metallisation is provided in the form of corresponding scanning elements, the metallisation being smooth in regions C whereas it is structured in regions D, corresponding to the region B.

It can further be seen from FIG. 3 that, in the region C, the dimensions or the diameter of the scanning elements produced by the metallisation 5 is smaller than the diameter of the metallised structure regions 5' in the thermotransfer foil regions D.

To form scanning elements c , d from the regions C, D, use is made of a dot whose diameter is larger (or also smaller) than the diameter of the metallised portions of the metallisation 5 or 5' respectively representing the scanning elements of the type c or b respectively. Usually in that respect use will be made of dots which, in accordance with the scanning elements of types a and b, permit coverage of the substrate over the full surface thereof by means of scanning elements. After transfer of the transfer layer 3 out of the regions C and D respectively onto the substrate, nonetheless scanning elements c and d are produced, whose dimensions can be markedly smaller than the dimensions of the scanning elements a and b, while in addition the scanning elements of type c appear shiny while the scanning elements of type d are capable of producing special optical effects as a result of the corresponding structure, for example a grating structure. In addition the scanning elements of type d seem apparently larger than those of type c, more specifically for the reason that the metallisation portions 5' are larger than the metallisation portions 5.

The scanning elements of types a, b, c and d therefore differ, as mentioned above, by virtue of the structure on the one hand. The scanning elements of type a and c have a smooth surface while the scanning elements of type b and d are provided with an optically effective structure, which structure is preferably a diffraction structure for producing a diffraction or interference effect, desirably a grating structure.

On the other hand the scanning elements of the various types also differ, at least apparently, in regard to their size. In the illustrated embodiment the scanning elements of type a and b are large so that, when scanning elements are transferred element-by-element by means of the thermotransfer printer, the entire surface of the substrate is covered over. In comparison the scanning elements of types c and d are apparently smaller so that, even when a scanning element is transferred onto each location intended therefor on the substrate, nonetheless the substrate is not covered over its entire surface area by scanning elements c and d. That effect however is only achieved in the present case by virtue of the fact that the optically visible surface of the scanning elements, for example the metallisation 5, 5', involves different dimensions. In actual fact however in the production of the scanning elements of types c and d, a respective part of the transfer layer which corresponds to a full scanning element surface area is also transferred so that even in the regions of the scanning elements of types c and d, the material of the transfer layer 3 is provided over the entire surface area involved when all scanning element positions are filled in the transfer procedure.

It will be appreciated however that it would also be possible in accordance with the invention to produce scanning elements of different diameters in a different fashion than by suitably part-surface surface metallisation 5, 5'. For example, coloured elements of different diameters could be formed in the transfer layer 3, and in addition they would not have to be embedded into a protective lacquer layer or the like. In the simplest case it would certainly be possible only to print scanning elements of the desired dimensions onto the transfer film 1 and possibly the detachment layer 6, and then just to provide a corresponding adhesive layer, in which case also the adhesive layer would not have to extend beyond the region of the scanning elements. When dealing with scanning elements of different colours, it would also be possible to produce a different structure, by for example using matt lacquer and lacquer which appears shiny.

It should also be pointed out that, to produce different colour effects, there is in particular the possibility of suitably colouring the transparent protective lacquer layer 7 or the structurable lacquer 9. The procedure in accordance with the invention can also in principle be used when metallisation is intended only in one or some regions, whereas other regions of the thermotransfer foil have no metallisation.

Accordingly scanning images in accordance with the invention can be embodied in the most widely varying embodiments and configurations, while a large number of possibilities is afforded by suitable variations in the scanning element diameters and the scanning element structure and colour, according to the desired configurations.

The materials and layer thicknesses of the individual layers of a thermotransfer foil according to the invention are described hereinafter. The thermotransfer foil can in principle be formed as follows:

| | |
|---|---|
| Anti-friction layer (2) | layer thickness 0.1 to 1.0 μm |
| Carrier film (1) | polyethyleneterephthalate with a layer thickness of 3.5 to 12 μm |
| Detachment layer (6) | wax layer (ester wax with a dropping point of 90° C.) and with a layer thickness of 0.005 to 0.5 μm |
| Protective lacquer layer (7) | layer thickness 0.4 to 2.0 μm |
| Structurable lacquer layer (9) | layer thickness 0.2 to 1.2 μm |
| Metal (5, 5') over full area or partial | aluminium with a layer thickness of 0.005 μm to 0.05 μm |
| Bonding agent (8) | layer thickness 0.2 to 1.2 μm |
| Heat-sealable adhesive layer (4) | layer thickness 0.5 to 5 μm |

The various layers can be of the following compositions:

| | Parts by weight |
|---|---|
| Anti-friction layer (2) (rear side) | |
| Methylethylketone | 810 |
| Cyclohexanone | 125 |
| Cellulose acetopropionate (m.p.: 210° C.) | 50 |
| Polyvinylidene fluoride (d = 1.7 g/cm | 15 |
| Protective lacquer layer (7) | |
| Methylethyketone | 455 |
| Ethylacetate | 240 |

-continued

| | Parts by weight |
|---|---|
| Cyclohexanone | 60 |
| Methylmethacrylate (Tg about 105° C.) | 245 |

Various soluble dyestuffs or pigments can optionally be added to produce coloured scanning images.

| | Parts by weight |
|---|---|
| Structurable lacquer layer (9) | |
| Methylethylketone | 400 |
| Ethylacetate | 260 |
| Butylacetate | 160 |
| Polymethylmethacrylate (softening point about 170° C.) | 150 |
| Styrenecopolymer (softening point about 100° C.) | 30 |
| Bonding agent (8) | |
| Methylethylketone | 450 |
| Toluene | 455 |
| Hydroxyl group-bearing vinylchloride-vinylacetate terpolymer (Tg = 80° C.) | 95 |
| Heat-sealable adhesive layer (4) | |
| Methylethyketone | 380 |
| Toluene | 400 |
| Ethylene vinylacetate terpolymer (m.p. 66° C.) | 60 |
| Ketone resin (m.p. 85–90° C.) | 80 |
| Vinylchloride-vinylacetate copolymer (m.p. 80° C.) | 70 |
| Silicon dioxide | 10 |

Partial metallisation of the transfer layer 3 in the regions C and D is produced in basically known manner. For example the metal layer 5, 5' applied in a conventional vapour deposit process can be printed over in a point-form scanning or raster print by means of an etching resist lacquer, in which case the etching resist lacquer can be of the following composition:

| | Parts by weight |
|---|---|
| Etching resist lacquer | |
| Methylethylketone | 550 |
| Ethylacetate | 175 |
| Cyclohexanone | 50 |
| Polyurethane resin (m.p. ≧ 200° C.) | 100 |
| Polyvinylchloride terpolymer (Tg = 90° C.) | 120 |
| Silicon dioxide | 5 |

The etching resist lacquer is advantageously applied with an electronically engraved scanning raster roller which usually prints at least two scanning areas with different scanning element sizes or densities. In that respect the following dimensions can be used:

| | |
|---|---|
| Scanning element density | 54/cm |
| Engraving depth | 50 μm |
| Cup diagonal | 110 μm ± 5 μm |

-continued

| | |
|---|---|
| Land width | 75 μm ± 5 μm |
| or | |
| Cup diagonal | 125 μm ± 5 μm |
| Land width | 60 μm ± 5 μm |
| or | |
| Cup diagonal | 170 μm ± 5 μm |
| Land width | 15 μm ± 5 μm |

The regions of the metallisation 5, 5', which are not covered over, can be etched at ambient temperature for example with an aqueous alkaline solution (pH≧10) after application of the etching resist layer and suitable hardening thereof.

However, the partial metallisation operation can also be effected using other processes known from the literature, for example employing water/alcohol-soluble blocking foundations or coats, using another etching technique, or also by means of laser removal, for example using an Nd-YAG-laser.

The various layer portions of the transfer layer 3 are applied to the carrier film 1 in the manner known per se from hot stamping foils, and for that reason a further description in that respect does not seem to be necessary here.

It is possible to proceed in different ways to produce the scanning image shown in FIG. 1.

One possibility provides that a thermotransfer foil which is metallised over its full surface area (see regions A, B in the illustrated embodiment) and which preferably has a plurality of differently formed, optically effective structures, is transferred in a scanning raster form onto the substrate, for example a plastic card. In that operation control of the thermotransfer procedure is desirably effected by way of a control computer and a software system of suitable modular structure. It is possible for example to use a thermal printer which has a degree of resolution of 16 dots/mm. The scanning rasters can be of different shapes, for example a circular shape, a rectangular shape, with rounded corners etc.

The other possibility (corresponding to operation with the regions C and D of the thermotransfer foil of the illustrated embodiment) provides using a partially metallised thermotransfer foil which in accordance with the regions C and D has for example a plurality of different, optically effective structures, wherein scanning raster areas of different scanning element sizes are additionally produced by the partial metallisation. In this case also the scanning image is produced by transfer, over the full surface area, of image regions which however involve different scanning element sizes or scanning element densities.

In the case of the optically effective surface structures as are provided for example in the regions B and D of the embodiment, variations can be produced by differences in the number of grating lines (500–2000 lines/mm), the grating line depth (0.2–2.0 μm) and the grating form (line, rectangle or sinusoidal grating structure), wherein the corresponding structures can be freely selected or combined, for adaptation to the desired effect.

The various image regions of the scanning image or the scanning element types therefore differ by virtue of different sizes, structures with different optical effects and possibly different colours, which means that a scanning image in accordance with the invention can be designed and composed in an extremely versatile fashion. In addition, by virtue of the specific structures, it can be provided that the scanning image affords a high degree of security against forgeries, in particular by way of colour copying. The different colouring of the scanning elements is achieved by different colouring of the protective lacquer layer.

What is claimed is:

1. A thermotransfer foil for the production of a scanning image, said thermotransfer foil comprising a carrier film and a transfer layer, said transfer layer comprising at least two kinds of scanning elements having different properties, wherein said transfer layer has a number of regions corresponding to the number of different scanning elements, wherein each of said regions is associated with a respective kind of scanning element, wherein the transfer layer in at least two of the different regions has scanning elements of different dimensions, and wherein areas of said transfer layer in said regions corresponding to said scanning elements can be transferred from said carrier film onto a substrate, to produce the different scanning elements thereon.

2. A thermotransfer foil as set forth in claim 1 wherein each of the different regions of the transfer layer has a respective structure with a different optical effect by virtue of diffraction, interference or reflection of the light.

3. A thermotransfer foil as set forth in claim 2 wherein the transfer layer further comprises a reflecting layer in at least one region.

4. A thermotransfer foil as set forth in claim 3 wherein the reflecting layer is formed by a metallization.

5. A thermotransfer foil as set forth in claim 3 wherein the optically effective structure is a diffraction structure producing a diffraction or interference effect, in particular a grating structure.

6. A thermotransfer foil as set forth in claim 3 wherein the transfer layer further comprises a transparent protective layer in at least one region adjoining the carrier film the transfer.

7. A thermotransfer foil as set forth in claim 6 wherein the transparent protective lacquer layers of at least two regions of the transfer layer are of different colors.

8. A thermotransfer foil as set forth in claim 2 wherein said transfer layer further comprises a lacquer layer and wherein the optically effective structure is impressed into said lacquer layer.

9. A thermotransfer foil as set forth in claim 8 wherein the protective lacquer layer covers the optically effective structure when the transfer layer is applied to said substrate.

10. A thermotransfer foil for the production of a scanning image comprising a carrier film and a transfer layer, wherein said transfer layer comprises a plurality of regions and a plurality of scanning elements corresponding to said plurality of regions, wherein at least one of said plurality of scanning elements has a layer comprising a smooth surface or a first optically effective structure and at least one of said plurality of scanning elements has a layer comprising a second optically effective structure which is different than said first optically effective structure, and wherein said plurality of scanning elements can be transferred from said carrier film onto a substrate to produce said scanning image thereon.

11. A thermotransfer foil as set forth in claim 10, wherein said first or second optically effective structure is a diffraction structure.

12. A thermotransfer foil as set forth in claim 10, wherein said transfer layer further comprises a reflecting layer in at least one of said regions.

13. A thermotransfer foil as set forth in claim 12, wherein said reflecting layer is formed by metallization.

14. A thermotransfer foil as set forth in claim 10, wherein said smooth surface has a reflective effect and said second optically effective structure has a diffractive effect.

15. A thermotransfer foil as set forth in claim 10, wherein different regions of the transfer layer have scanning elements with different optical effects by virtue of diffraction, interference or reflection of the light.

16. A thermotransfer foil as set forth in claim 10, wherein said transfer layer further comprises a deformable layer, and wherein said first or second optically effective structure is formed in said deformable layer.

17. A thermotransfer foil as set forth in claim 10, wherein said transfer layer further comprises a transparent protective layer in at least one region adjoining said carrier film.

18. A thermotransfer foil as set forth in claim 17, wherein said the transparent protective lacquer layers of at least two regions of the transfer layer are of different colors.

19. A thermotransfer foil as set forth in claim 17, wherein said protective lacquer layer covers the first and second optically effective structure when said transfer layer is applied to said substrate.

20. A thermotransfer foil for the production of a scanning image comprising a carrier film and a transfer structure arranged in a plurality of regions, said transfer structure comprises a plurality of transfer layers and at least two kinds of scanning elements, wherein a first scanning element has a layer comprising a smooth surface or an optically effective structure and a second scanning element has a diffractive structure, wherein at least one scanning element corresponds to each region, wherein at least one of said transfer layers is a reflective layer in at least one region, and wherein said scanning elements can be transferred from said carrier film onto a substrate to produce said scanning image thereon.

* * * * *

UNITED STATES PATENT AND TRADEMARK OFFICE

CERTIFICATE OF CORRECTION

PATENT NO. : 6,428,877 B1 
APPLICATION NO. : 08/793826
DATED : August 6, 2002
INVENTOR(S) : Suss et al.

It is certified that error appears in the above-identified patent and that said Letters Patent is hereby corrected as shown below:

IN THE SPECIFICATION:

Column 7, line 6, now reads: “than by suitably part-surface surface metallisation 5, 5'. For”
should read: --than by suitably part-surface metallisation 5, 5'. For--

Column 7, line 63, now reads: “(d = 1.7 g/cm”
should read: --(d = 1.7 g/cm3)--

Signed and Sealed this

Thirty-first Day of July, 2007

JON W. DUDAS
*Director of the United States Patent and Trademark Office*